March 29, 1932.  M. H. ACKERMAN  1,851,075

SEAL RING

Filed May 2, 1928

M. H. Ackerman, Inventor

By C. A. Snow & Co.

Attorneys

Patented Mar. 29, 1932

1,851,075

UNITED STATES PATENT OFFICE

MICHAEL H. ACKERMAN, OF MANSFIELD, OHIO, ASSIGNOR OF ONE-HALF TO LOUIS C. SICKEL, OF CALEDONIA, OHIO

SEAL RING

Application filed May 2, 1928. Serial No. 274,586.

This invention relates to a composite seal ring and more especially to an improvement on my copending application filed January 28, 1928, Serial Number 250,224.

One of the objects of the invention is to provide a composite seal ring designed primarily for use within the hub of a flywheel or other structure rotatable with the shaft in the bearing to be sealed.

A further object is to provide a seal ring which, because of its location in the rotatable member on the shaft, can be easily replaced and repaired without the necessity of dismantling the shaft.

A further object is to provide a seal ring which permits ample lubrication of the bearing and possesses all of the advantages incident to the use of the ring disclosed in my application before referred to.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
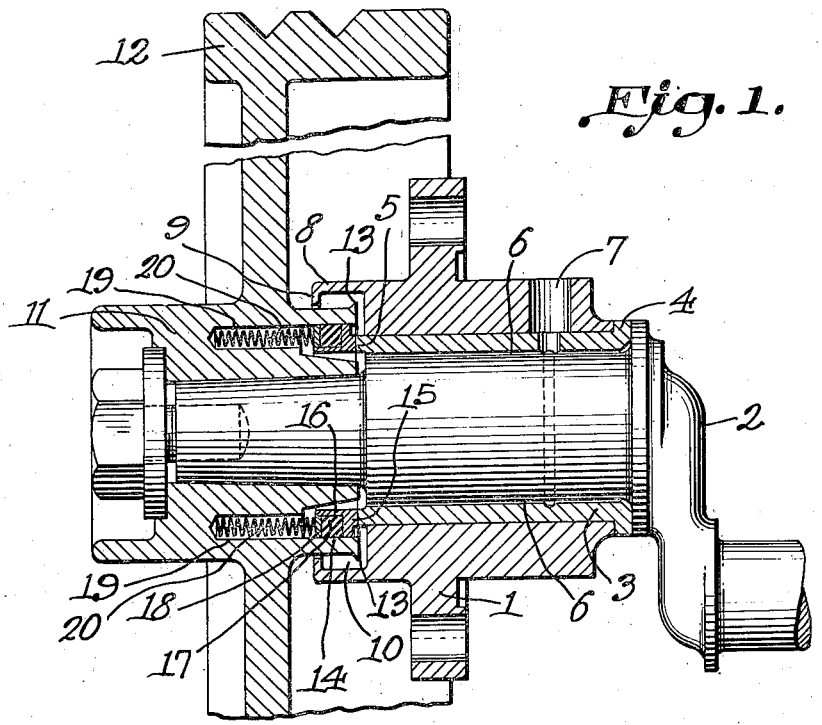
Figure 1 is a section through the seal ring and adjacent parts.

Referring to the figures by characters of reference 1 designates a cap adapted to close an aperture in a crank case, this cap providing a bearing for a crank shaft 2 and being suitably lined by a bushing 3. This bushing may be formed with an annular flange 4 at its inner end adapted to lap the inner end of the bearing member or cap 1 and the outer end of the bushing is adapted to project slightly beyond the outer end of the bearing member 1 to present a smooth wear surface indicated generally at 5. Oil grooves 6 may be extended longitudinally within the bushing, these grooves being open at their ends and being in communication with an oil hole 7. A circular flange 8 is extended outwardly from the bearing member 1 and has an inturned continuous lip 9 at its outer or free end, this lip and flange cooperating to provide an annular trough 10 for collecting lubricant thrown from or dripping off of a rotatable element carried by the shaft 2.

In the structure illustrated in Figure 1 the hub 11 of a wheel 12 is secured to the shaft 2 and one end of this hub projects into the trough 10. Flange 9 is spaced from the hub but the inner end of the hub has an annular bead 13 from which lubricant is adapted to drain into the trough 10. The inner end of the hub 11 has an annular groove 14 in which is seated a packing ring 15 formed preferably of steel and having a flange 16 extending back into the recess 14 from the inner edge of the ring while the outer edge of the ring fits loosely against the outer wall of the recess 14 so as to float in said recess and compensate for any wobble motion relative to the surface 5 due to the hub being out of true. A ring 17 of rubber is mounted on the flange 16 and is gripped between ring 15 and a washer 18 which extends around the inner portion of the flange 16. Bores 19 are formed in the hub back of the recess 14 and have coiled springs 20 seated therein. Springs thrust against the washer 18 and press it against the rubber ring 17 so as to hold said ring under compression and expand it inwardly against the flange 16 and outwardly against the outer wall of the recess 14. Thus a tight sealing connection is provided between the hub and the ring 15 and, under the action of the springs 20, is pressed firmly against the bushing 3 which is preferably formed of bronze. The space surrounded by the projecting end of the bushing 3 and the ring 15 opens into the inner portion of the recess 14 so that lubricant can thus flow back of the washer 18 and the piston springs 20 and exerting a pressure against the rings 17 and 15. The working fit between the ring 15 and the end of the bushing 3 results in a tight sealed connection between the parts which will prevent leakage of lubricant and pressure. Any lubricant located outside of the ring will be collected by the trough 10. Obviously by detaching the hub 11 from the shaft 2, access to the seal ring can be easily obtained. Furthermore it is thus possible readily to withdraw the shaft inwardly from the bearing 1 and its bushing 3.

Figure 2:
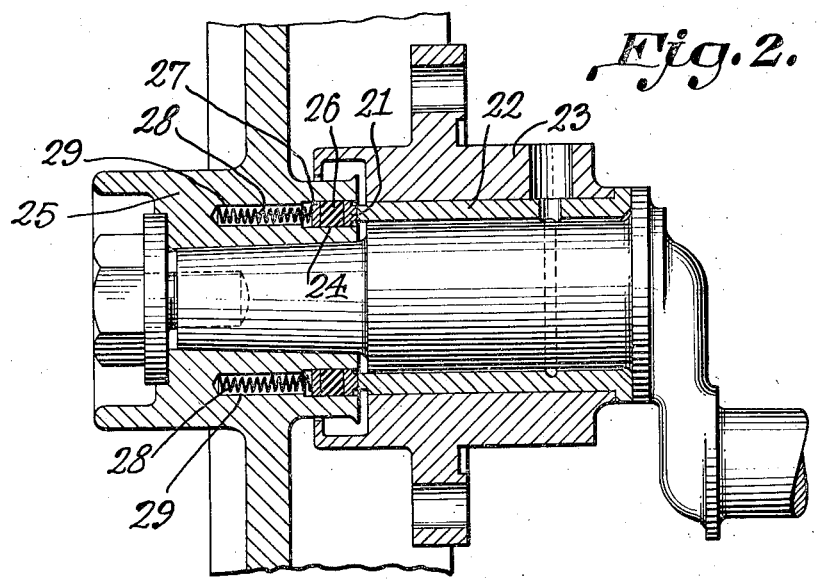
Figure 2 is a similar view showing a slightly modified construction.

The device heretofore described is designed for use in high pressure structures. Where there is a low pressure or vacuum in the crank case, the modified structure illustrated in Figure 2 can be employed. In this structure the parts are the same as those already described with the exception that the ring 21 which has a working fit and a sealing contact with the end of the bushing 22 in bearing 23 is not formed with a flange. Instead this ring is seated in a circular groove 24 in the hub 25 and has a rubber ring 26 interposed between it and a washer 27. Springs 28 similar to the springs 20 thrust against this washer and are seated in bores 29 in the hub. The pressure of the washer 27 against the ring 26 serves to compress this ring against the ring 21 and hold the ring 21 tightly against the end of the bushing 22. At the same time the rubber ring 26 is bulged against the walls of the recess 24 to form a sealing contact at these points.

Although the sealing ring has been shown and described in connection with the hub of a wheel it is to be understood that it can be mounted in any member secured to and rotatable with the shaft. It will be noted that the cooperating wear elements of the structures can be renewed readily, if found desirable. In other words, the bushing 3 and ring 15 can both be replaced and the same is true of the parts 22 and 21.

What is claimed is:

A device of the class described including a stationary structure, an annular drain trough thereon, a bushing removably mounted in said structure and having one end projected into the space defined by said trough, the projecting end constituting a bearing surface, a shaft journaled in the bushing and thrusting against the other end thereof, a hub wedged and sealed on the end of the shaft and projecting at one end into the space defined by the trough, there being a recess in and concentric with said end of the hub in communication with the space between the bearing surfaces of the shaft and bushing, a bearing ring loosely seated in said recess and cooperating with the end of the bushing to form a sealing working fit, a packing ring of soft material engaging the wall of the recess and mounted on a portion of the bearing ring to support said bearing ring in the recess for floating movement, and spring means in the hub for holding the bearing ring in sealing position against outside pressure, the recess constituting a means for conducting pressures from between the shaft and bushing to a point in the hub for expanding the packing ring against one wall of the recess and pressing the bearing ring against the bushing.

In testimony that I claim the foregoing as my own, I have hereto affixed my signature.

MICHAEL H. ACKERMAN.